(12) United States Patent
Lee et al.

(10) Patent No.: US 10,902,333 B2
(45) Date of Patent: Jan. 26, 2021

(54) METHODS AND SYSTEMS FOR COLLECTING AND ANALYZING DATA USING A COGNITIVE FABRIC TO PROVIDE COGNITIVE AGILITY FOR THE ANALYTIC TRADECRAFT

(71) Applicant: Booz Allen Hamilton Inc., McLean, VA (US)

(72) Inventors: Ki Hyun Lee, McLean, VA (US); John David Pisano, Chester, OH (US); Saurin Pankaj Shah, Fairfax Station, VA (US); Andre Tai Nguyen, Seattle, WA (US); Yuxun Lei, Seattle, WA (US); Christopher Brown, Herndon, VA (US); Michael Becker, McLean, VA (US)

(73) Assignee: BOOZ ALLEN HAMILTON INC., McLean, VA (US)

(*) Notice: Subject to any disclaimer, the term of this patent is extended or adjusted under 35 U.S.C. 154(b) by 0 days.

(21) Appl. No.: 16/596,188

(22) Filed: Oct. 8, 2019

(65) Prior Publication Data

US 2020/0111013 A1    Apr. 9, 2020

Related U.S. Application Data

(60) Provisional application No. 62/742,790, filed on Oct. 8, 2018.

(51) Int. Cl.
*G06N 5/04* (2006.01)
*H04L 29/08* (2006.01)

(52) U.S. Cl.
CPC ............. *G06N 5/043* (2013.01); *H04L 67/10* (2013.01)

(58) Field of Classification Search
USPC .......................................... 706/10
See application file for complete search history.

(56) References Cited

U.S. PATENT DOCUMENTS

| | | | |
|---|---|---|---|
| 7,023,979 B1 * | 4/2006 | Wu ..................... | H04M 3/5233 379/265.11 |
| 7,643,653 B2 * | 1/2010 | Garoutte ............ | G06K 9/00771 382/103 |
| 7,676,034 B1 * | 3/2010 | Wu .................... | H04M 15/8061 379/265.01 |
| 7,772,880 B2 * | 8/2010 | Solomon ........... | G06F 15/17387 326/38 |

(Continued)

OTHER PUBLICATIONS

International Search Report and Written Opinion of the International Searching Authority (Forms PCT/ISA/220, PCT/ISA/210 and PCT/ISA/237) dated Jan. 6, 2020, by the International Bureau of U.S. Patent and Trademark Office in corresponding International Application No. PCT/US19/55195. (7 pages).

*Primary Examiner* — Michael B Holmes
(74) *Attorney, Agent, or Firm* — Buchanan Ingersoll & Rooney PC (57) ABSTRACT

A system and method are disclosed for collecting and analyzing data in a cognitive fabric. The system can include a network of intelligent nodes, each node being configured for sharing or receiving data as a function of analytic processing to be performed at the node. Each node having an on-board processor to generate an object from shared data and the analytic processing software

8 Claims, 5 Drawing Sheets

(56) References Cited

U.S. PATENT DOCUMENTS

| | | | |
|---|---|---|---|
| 8,095,923 B2* | 1/2012 | Harvey | G06F 8/60 717/171 |
| 8,103,853 B2* | 1/2012 | Ramesh | G06F 15/7867 712/15 |
| 8,739,035 B2* | 5/2014 | Trethewey | G06F 1/1632 715/705 |
| 9,875,440 B1 | 1/2018 | Commons | |
| 9,933,620 B2* | 4/2018 | Van Heugten | G02C 7/04 |
| 10,247,947 B2* | 4/2019 | Van Heugten | G02C 7/04 |
| 10,695,167 B2* | 6/2020 | Van Heugten | A61F 2/1624 |
| 10,732,416 B2* | 8/2020 | Van Heugten | G09G 3/32 |
| 2008/0010631 A1* | 1/2008 | Harvey | G06F 8/60 717/131 |
| 2009/0228684 A1* | 9/2009 | Ramesh | G06F 15/16 712/29 |
| 2016/0283494 A1* | 9/2016 | Krishnaswamy | G06F 16/3334 |
| 2018/0093092 A1* | 4/2018 | Howard | A61N 5/0622 |

* cited by examiner

METHODS AND SYSTEMS FOR COLLECTING AND ANALYZING DATA USING A COGNITIVE FABRIC TO PROVIDE COGNITIVE AGILITY FOR THE ANALYTIC TRADECRAFT

FIELD

The present disclosure relates to methods and systems for collecting and analyzing data in a cognitive fabric to automate aspects of an analytic tradecraft.

BACKGROUND INFORMATION

Today's operational environment is highly complex. For example, intelligence agencies are dealing with high volumes, varieties, and velocity of intelligence (multi-classification) information. Analysts are single threaded because they are collecting and correlating data from many disparate data sources, thus limiting their capacity. The "request to decision" cycle is shrinking considerably while its scope is continuously expanding to support 24×7 operations across global commands (e.g., both defense and commercial) and down to the tactical edge.

Defense and intelligence agencies, as well as commercial enterprises, are dealing with asymmetric threat environments where the "data to decision" cycle is shrinking. Analysts are used to operating on experience and instinct, leveraging relationships to exploit data. There is a lack of trust in artificial intelligence (AI) to automate aspects of their processes.

Also, collaboration among analysts and operators in a globally distributed area of responsibility (AOR) is challenging from the perspective of sharing best practices, lessons learned, and trends in intelligence findings. As analysts transition in/out, institutional knowledge and knowledge of their specific AOR is lost. Understanding and knowledge of the analyst workflow is not consistently passed to new analysts.

The highly complex nature of today's operational environment further requires adaptation to evolve Analyst Standard Operating Procedures (SOP) and Tactics, Techniques, and Procedures (TTP). Analytic Tradecraft (AT) and AI needs to adapt to routine and creative behavior of analysts. As referenced herein, an analytic tradecraft is, for example, any tactics, techniques and procedures of human analysis of data to draw conclusions therefrom to provide useable information for a mission (e.g., defense or commercial).

The potential for algorithms to drift (reducing accuracy and precision) can increase when managing different baselines across operational environments which can reduce accuracy and subsequently decrease analyst trust.

SUMMARY

A system is disclosed for collecting and analyzing data in a cognitive fabric to automate aspects of an analytic tradecraft, the system comprising: a network of at least two intelligent nodes which communicate with one another for data analysis, each node being configured with a communication interface for sharing data as a function of analytic processing software present at the node; and each node having an on-board processor to generate an object from shared data and the analytic processing software.

A method is disclosed for collecting and analyzing data in a cognitive fabric to automate aspects of an analytic tradecraft, the method comprising: configuring a network of at least two intelligent nodes which communicate with one another for data analysis, each node being configured with a communication interface for sharing data as a function of analytic processing software to be executed at the node; and generating an object at a node via an on-board processor using the shared data and analytic processing software.

BRIEF DESCRIPTION OF THE DRAWINGS

Other objects and advantages of the present disclosure will be realized from the following description of exemplary preferred embodiments when read in conjunction with the drawings set forth herein.

DETAILED DESCRIPTION

Exemplary embodiments of the present disclosure are directed to methods and systems for collecting and analyzing data for commercial and defense based uses by forging a partnership of humans and machines using a cognitive fabric (CF) as a form of algorithmic warfare for automating and assisting the analytic tradecraft of analysts, operators, and users.

Figure 1:
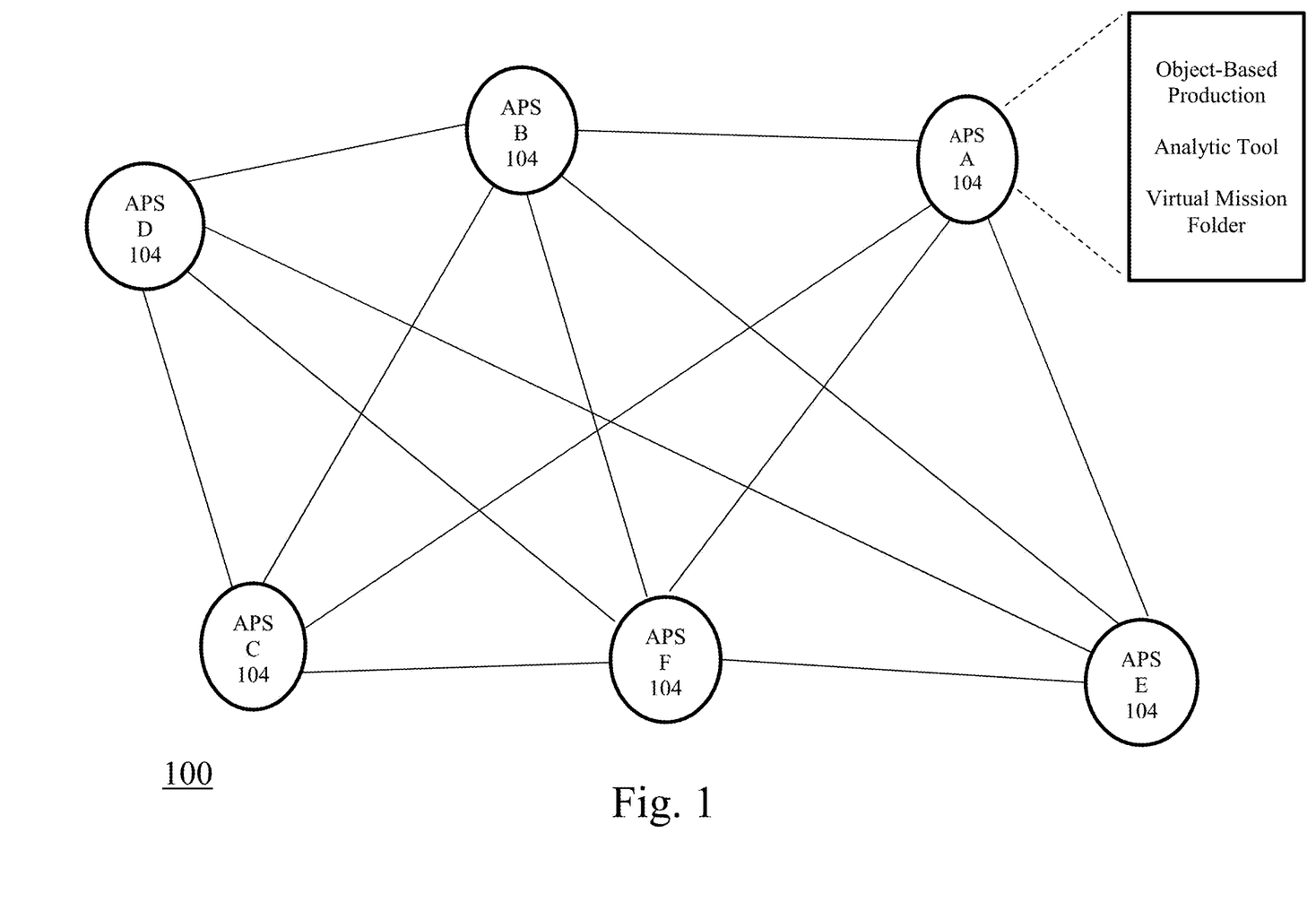
FIG. 1 illustrates a system for collecting and analyzing data in a cognitive fabric in accordance with an exemplary embodiment of the present disclosure.

FIG. 1 illustrates a system for collecting and analyzing data in a cognitive fabric in accordance with an exemplary embodiment of the present disclosure. The system 100 is a cognitive fabric for automating aspects of an analytic tradecraft. The system 100 includes a distributed dynamic network 102 of intelligent nodes 104. The network 102 is an ad hoc network in which the nodes 104 communicate with one another for data analysis.

Figure 2:
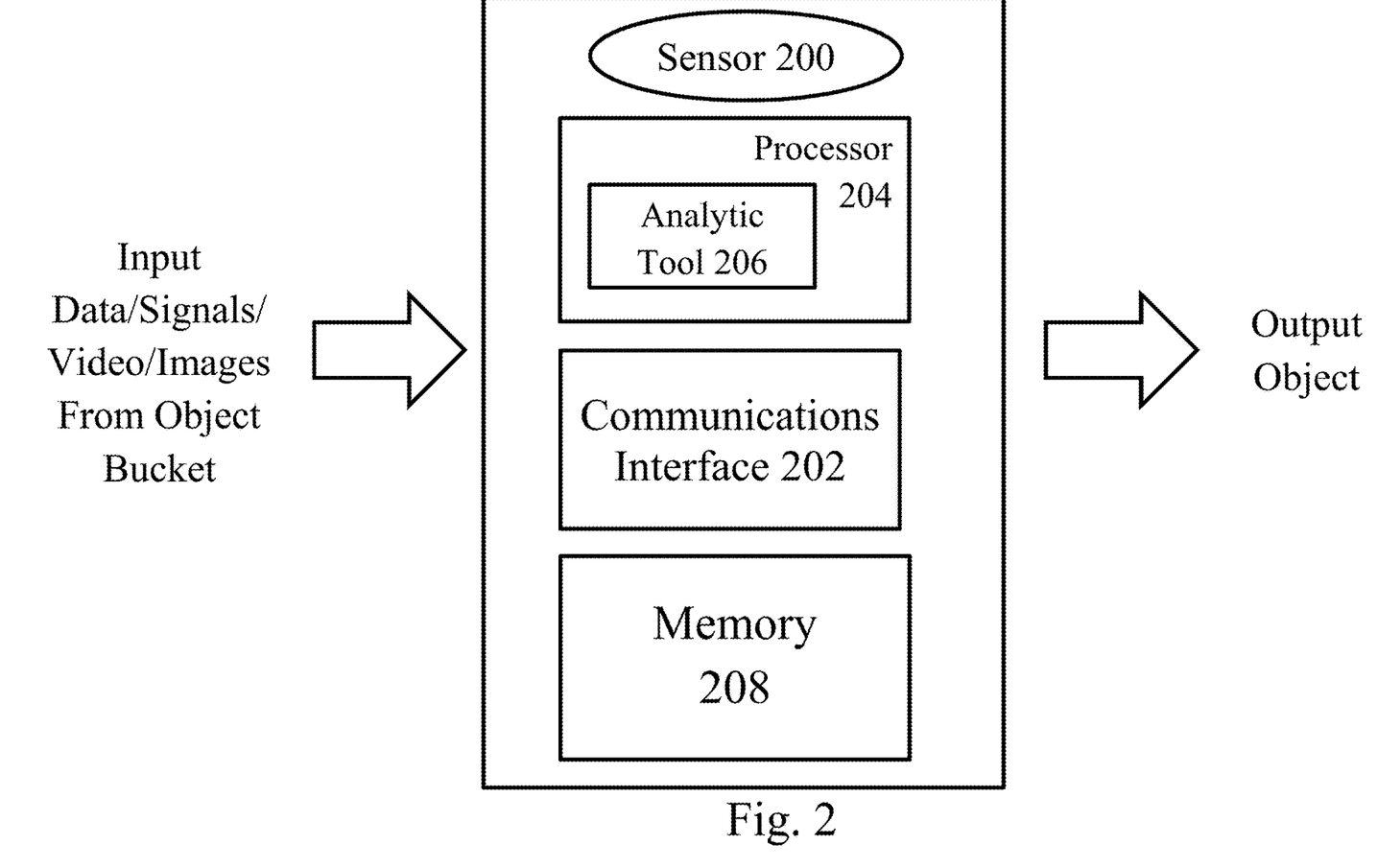
FIG. 2 illustrates components of an intelligent node in accordance with an exemplary embodiment of the present disclosure.

FIG. 2 illustrates components of an intelligent node in accordance with an exemplary embodiment of the present disclosure. Each node 102 can include a sensor 200 for acquiring or obtaining data. The sensor 200 can be configured to detect electronic signals used in communications system, radar, and weapons systems. According to another exemplary embodiment, the sensor 200 can be configured to collect or obtain data from information flows in news media, radio, television, the Internet (blogs, publications, discussion groups, media streams, social media), public databases, repositories, publications, and reports, information from professional and academic documents and presentations, commercial data including images, financial information, and assessments obtained from corporate and industrial databases, and other documentation including technical reports, patents, working papers, business documents, unpublished works, newsletters, and other sources of information.

According to another exemplary embodiment, the sensor 200 can be configured to obtain full motion video or still images of a tracked target. The full motion video can also be accompanied with metadata defining geospatial coordinates and/or an orientation of the sensor 200. The sensor 200 can be configured to obtain the data automatically and/or under the control or from input by a user. The node 104 can also include a communication interface 202 for sharing data as a function of analytic processing software present at the node. The communication interface 202 can be connected to receive and/or transmit data to other nodes in the network 102. The communication interface 202 can also operate in combination with the sensor 200 to receive and/or obtain data from remote sources on a Local Area Network (LAN) or Wide Area Network (WAN). Each node 102 can also be configured to include an on-board processor 204. The processor 204 can be encoded with an analytic tool 206 (e.g., analytic processing software) which is executed by the processor 204 to generate an object from the sensed and/or shared data.

The analytic tool 206 of each node 102 can be configured to leverage objects and machine learning-enabled analytic models of other nodes into a mind map. Evidence can be extracted from the Information obtained from the other nodes and auto-correlated based on the information and/or data node is specified to monitor as defined by an analyst through the analytic tool 206. The analytic tool 206 can be retrained and/or learn from the information obtained from the network 102 (e.g., cognitive fabric) based on the explicit and implicit feedback obtained from the object analysis. For example, based on feedback the analytic tool 206 can be configured to learn the habits and behaviors of analyst and dynamically adapt the analytic model executed by the analytic tool based on trends detected in the data. The objects generated by each node 102 can be continuously identified and refined by the analytic tool 206 through execution of the analytic model. The analytic model dynamically adapts to observed and confirmed trends in objects based on confirmation, reinforcement, and/or feedback provided on a generated object received by an analyst.

According to an exemplary embodiment of FIG. 1, the objects generated by each node can be compiled in a central database or memory location on the network 102. The central storage location can correspond to a location one of the plurality of nodes 104 or a memory location or device on the network 102, which is controlled by one of the plurality of nodes. According to another exemplary embodiment, the storage of the objects can be distributed across the network 102 such that each node retains control of and secure storage of the object and only provides a link to data associated with the object. Each node 104 can be configured to obtain shared data objects over the network 102 and automatically correlate the shared data from the other intelligent nodes and generate a new object and/or revise a previously generated object based on a correlation of the shared data.

Figure 3:
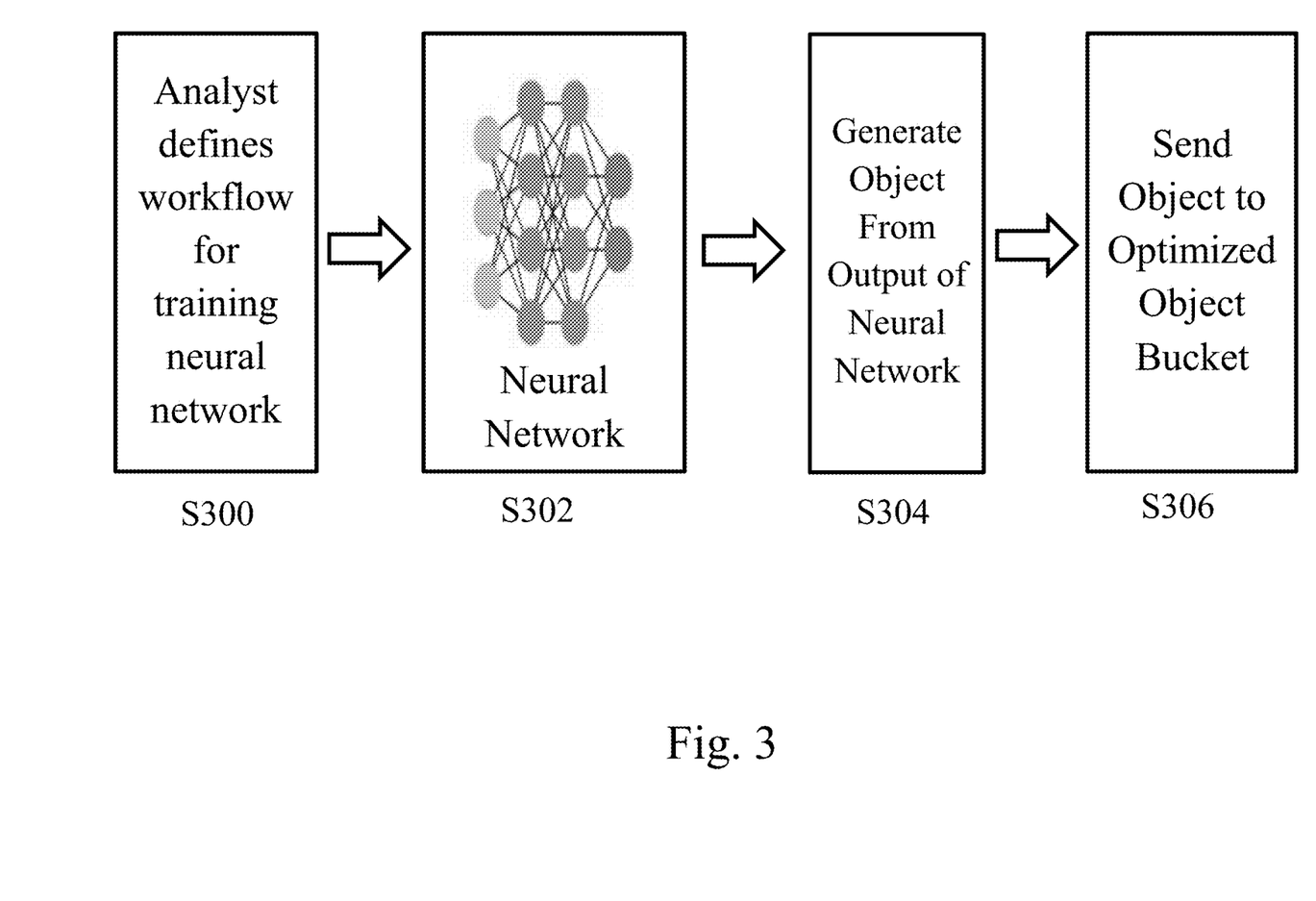
FIG. 3 is a flow diagram of an advanced object detection technique in accordance with an embodiment of the present disclosure.

FIG. 3 is a flow diagram of an advanced object detection technique in accordance with an embodiment of the present disclosure. As shown in FIG. 3, the analytic tool 206 of each node 102 can be configured to map a human analytic tradecraft within a mind map and applying Artificial Intelligence within the mind map activities, and correlating object-based evidence, including at least one generated object, to activity that corresponds to the presence of that object. That is, the analytic tool 206 can be configured to execute an analytic model and can be trained according to parameters for events, activities, targets, for an area of interest monitored by the sensor 200 (S300). For example, the neural network of the analytic tool can be trained to look for certain vehicles and/or personnel based on general and/or specific characteristics, which are in a general or specified proximity to friendly and/or enemy forces, and in the event a threshold number of vehicles are detected, they are observed to be in a specific formation. The analytic tool 206 can obtain object information generated by other nodes within the cognitive fabric over the network 102 to determine the type of activity being observed or undertaken in the area of interest (S302). The analytic tool 206 processes the information and generates an object (S304), which is sent to the object database for sharing within the cognitive fabric (S306).

In such a system, the object-based evidence can include information regarding objects generated and an input of at least one known real-world event to provide information regarding anticipated activity, wherein the mapping is auto-adapted to dynamically evolve based on the real-world event input.

According to an exemplary embodiment of the present disclosure, the object repository can be implemented as a virtual mission folder stored on a memory or in persistent storage of an associated computer processor 204 of a node 104. The computer processor 204 can include a user interface for input of feedback from a user to access the shared data, correlations of the shared data, and anticipated activity.

The exemplary system shown in FIGS. 1-3 can include at least four components.

The first component is a Federated Data Network configured for bringing the analytic tradecraft (e.g., tactics, techniques and procedures of analysts/operators) to the data. Exemplary embodiments discussed herein push analytic processing to the data versus traditional ingestion and consumption data approaches whereby data is acquired at one or more locations, and fed back to a central location for use by the analysts/operators/users. The ad hoc network 102 and analytic tool 206 of each node 104 establish the cognitive fabric of FIG. 1, which provides for data discovery, access, and processing across a distributed data network. Data acquired at each node 104 and processed via the analytic tool 206 of the processor 204 is made available or shared within the cognitive fabric as a data object through resilient distribution across a network 102 of data nodes 104. The resilient distribution refers to, for example, an ability of a data node 104 to dynamically connect with other nodes via dynamically changing, ad hoc communication paths. A data registry, which can be provided in memory 208 of one of the nodes or associated with one of the nodes 208, applying, for example, blockchain architectural principles, can be included to enable data discovery and provide a user with data asset lineage and pedigree.

A second component of the system of FIGS. 1-3 relates to Object Based Production in which objects are generated by automating multi-intelligence data fusion into objects. This enables collaboration across shared and uniformly-defined objects so that algorithms improve over time. Objects of interest can be pushed to a user for processing, taking humans out of performing tedious data queries and manual fusion while enhancing the result. This process enables continuous search and discovery across dynamic data sources and historical data thereby freeing the user from tedious tasks such as categorization and labeling of intelligence data.

A third component of the system of FIGS. 1-3 includes an Analytic Neural Network for performing a mind-mapping of the Intel Analyst Tradecraft. As shown in FIG. 3, each node can be configured to according to a specified tradecraft and via the analytic tool 206 map the human analytic tradecraft into mind maps. This mapping enables automated collection and analysis of data through the use of artificial intelligence (AI). As a result, evidence can be auto-correlated to an activity based on information processing. The discovery of known and unknown knowledge through reusable objects is fed into the mind map (e.g., neural network) at each respective node 104. The intersection and aggregation of knowledge across different mind maps dynamically links users operating within the cognitive fabric. Mind maps are auto-adapted through smart learning based on input of real-world events whereby deltas in expected versus actual actions can be detected and used to dynamically evolve the model or advise the user that the model should be evolved.

A fourth component of the system of FIGS. 1-3 includes an Object Bucket or Virtual Mission Folder for providing an AI Interface to a user/analyst for increasing capability of the analyst. The Object Bucket moves the analyst from a single-threaded environment (e.g., analyzing as a single thread high volumes of data) to a multi-threaded environment wherein multiple data threads are automatically analyzed, combined/aggregated and processed into higher order intelligence for the analyst to access and assess. The Object Bucket can expose AI-enabled analytic workflows that are shareable across the Cognitive Fabric. Via the Object Bucket, a user at a respective node 104 can launch an analytic tool 206 and interact with Neural Network mind maps of other nodes 104 through the Object Bucket. The Object Bucket is populated with objects of interest and analytic outcomes from the Analytic Neural Network mind map(s) 302 of each node 104. Data lineage and pedigree associated with the objects of interest are included in the results providing transparency to the user. The Object Bucket can provide a mechanism to capture explicit and implicit feedback signals from the user. The Virtual Mission Folder 406 can, for example, continue to execute until the Analyst closes the folder.

Analysts operating in an environment of high volume data analysis require the ability to quickly derive meaning from data available across the intelligence community (IC) enterprise, establish meaningful/relevant connections to other Analysts and undiscovered data across the IC, and provide accurate and actionable intelligence to decision makers that enables higher precision to execute operations. Exemplary embodiments as disclosed herein allow analysts to overcome data analysis challenges by:

Codifying processes across the distributed environment, connecting analysts and data through the Cognitive Fabric;

Providing data discovery, access, and processing across distributed sources to include data lineage and pedigree (e.g., via use of a blockchain ledger on each node to authenticate data shared by one node with another);

Applying AI against Analytic Mind Map (capturing the analytic tradecraft) to automate and optimize data discovery and exploitation, manual analyst tasks, and establish linkages across Analyst communities of interest (COIs).

Figure 4:
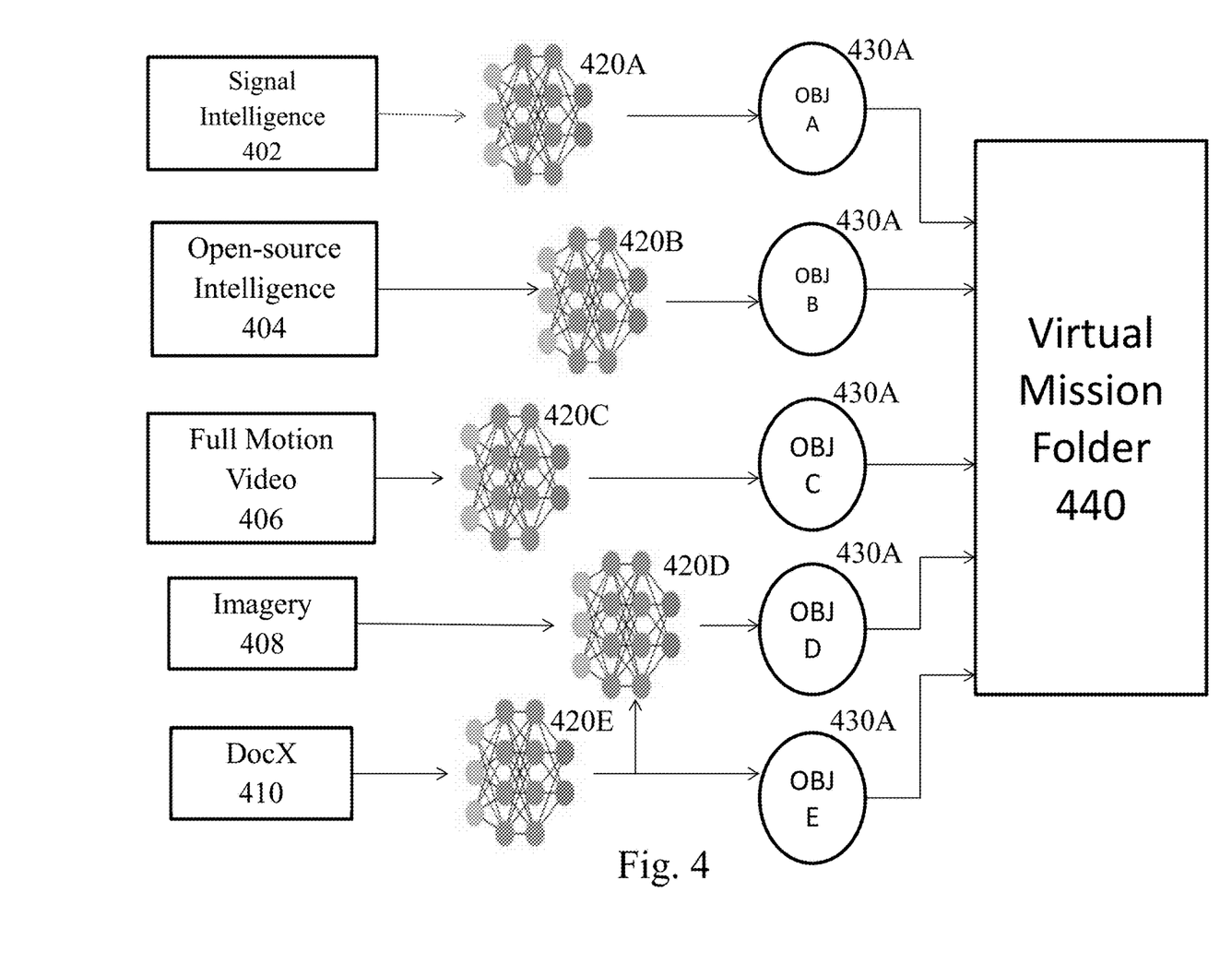
FIG. 4 is flow diagram of an advanced object detection system for an airfield in accordance with an exemplary embodiment of the present disclosure.

FIG. 4 is flow diagram of an advanced object detection system for an airfield in accordance with an exemplary embodiment of the present disclosure.

As shown in FIG. 4, the system is configured to focus on groups of objects with large available technologies and datasets to develop and demonstrate capabilities For example, the data of interest can be obtained from sources including signal intelligence 402, open-source intelligence 404, full-motion video 406, imagery 408, and public and non-public industry/trade/corporate documents (DocX) 410. The data can be processed at each respective node in the analytic tool 206 based on information obtained at each node via the sensor 200. The data is obtained over the network 102 via the virtual mission folder 440. All of the data can be processed by the neural networks 420A-E or mind maps to generate objects 430A-E which are shared with other nodes 104 via the cognitive fabric.

According to an exemplary embodiment, the data from which the data field can be identified is obtained through the following:

a DIUxxView dataset can be used as a source for data to demonstrate "object" and "bucket" construct;

an FAA data set containing airport facility and runway;

an NTSB Aviation Accident database; and

Extensions include additional sources such as SAR imagery and/or SIGINT source data.

Prototype interface provides Google-like search result of rank ordered air fields and metadata that indicates additional information about the object, sub-objects, and intelligence sources.

Accessing search result shows objects and sub-objects pushed to the analyst

Figure 5:
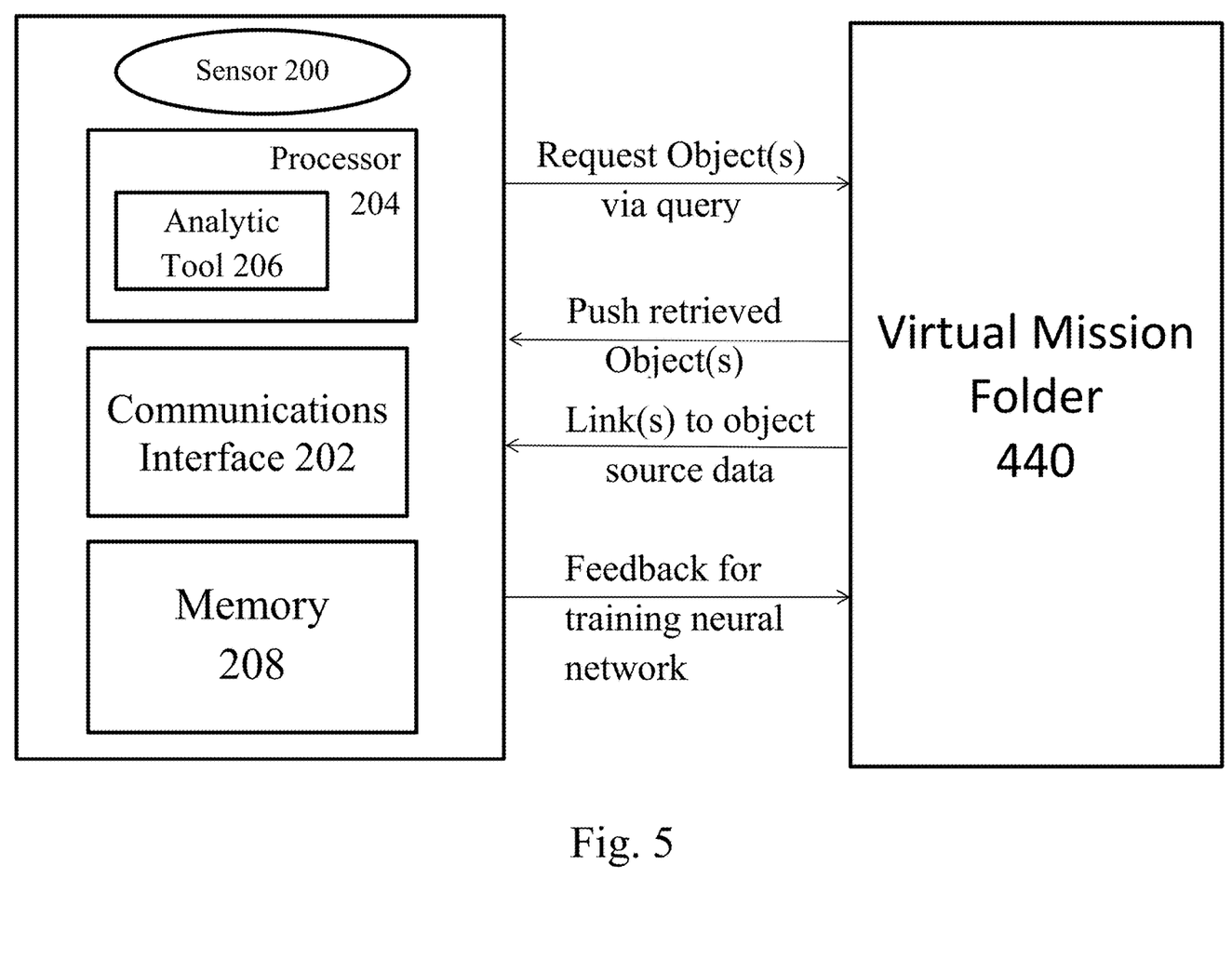
FIG. 5 is block diagram illustrating an access of objects from a virtual mission folder of the advanced object detection of FIG. 4 in accordance with an exemplary embodiment of the present disclosure.

Linkages to the source data are available for further analyst review and analysis Analyst provides feedback to support algorithm training/reinforcement FIG. 5 is a block diagram illustrating an access of objects from a virtual mission folder of the advanced object detection of FIG. 4 in accordance with an exemplary embodiment of the present disclosure. The access shown in FIG. 5 provides an analyst with object-based production across multiple intelligence sources which supports activity-based intelligence and shifts the analyst's focus from data gathering to analysis. In accessing object data, the node 104 can request one or more objects from the Virtual Mission Folder via parameters submitted via a query. The Virtual Mission Folder pushes the data related to the object to the node 104. According to an exemplary embodiment, the Virtual Mission Folder can provide a link to a location of the object data, which can then be accessed by the analyst manually by selecting the link. Upon obtaining and analyzing the data, the analyst can provide confirmation and/or feedback to the Virtual Mission Folder regarding the accuracy in the relationship of the retrieved data to the query. The feedback provided by the analyst is used to train the mind maps and/or cognitive fabric.

As already discussed, FIG. 2 illustrates components of an intelligent node in accordance with an exemplary embodiment of the present disclosure. Each node may be a stationary or mobile computing device. The processor 204 of each node 104 may be a hardware processor that is a special purpose or a general-purpose processor device. The hardware processor device may be connected to a communication infrastructure, such as a bus, message queue, network, multi-core message-passing scheme, etc. The on-board network may be any network suitable for performing the functions as disclosed herein and may in combination with the communication interface 202 communicate with a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The node 104 may also include a memory 208 (e.g., random access memory, read-only memory, etc.). The memory 208 may be read from and/or written to in a well-known manner. In accordance with an exemplary embodiment, the memory 208 is a non-transitory computer readable recording media (e.g., ROM, RAM hard disk drive, flash memory, optical memory, solid-state drive, etc.). A hardware processor 204 as discussed herein may be a single hardware processor, a plurality of hardware processors, or combinations thereof. Hardware processor devices 204 of the exemplary embodiments described herein may have one or more processor "cores."

Data stored in each node (e.g., in the memory 208) may be stored on any type of suitable computer readable media, such as optical storage (e.g., a compact disc, digital versatile disc, etc.), magnetic storage (e.g., a hard disk drive), or solid-state drive. An operating system, one or more applications, and one or more hypervisors can be stored in the memory 208.

The communications interface 202 may be configured to allow software and data to be transferred between the mobile electronic device and external devices. Exemplary communications interfaces 202 may include a wireless modem (e.g., transceiver), a network interface (e.g., an Ethernet card), a communications port, a PCMCIA slot and card, etc. Software and data may be transferred via the communications interface to external devices.

The memories which are non-transitory computer-readable recording media, may store operating systems and/or computer programs to be executed by the mobile electronic device. Computer programs may also be received via the communications interface. Such computer programs, when executed, may enable the mobile electronic device to implement its operative functions that may be controlled, as discussed herein, based on the detected location of the portable electronic device. For instance, the operating system and/or computer programs, when executed, may enable hardware processor device to access or operate hardware components such as the camera, the microphone, the peripheral interface, the USB/Firewire/Thunderbolt interface ports, and/or the display (e.g., LED screen, touch screen, etc.).

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A system for collecting and analyzing data in a cognitive fabric to automate aspects of an analytic tradecraft, the system comprising:

a network of at least two intelligent nodes which communicate with one another for data analysis, each node being configured with a communication interface for sharing data as a function of analytic processing software present at the node; and each node having an on-board processor configured to generate an object using shared data from one or more sources and the analytic processing software.

2. The system according to claim 1, wherein the network can be statically or dynamically defined to represent either a structured or ad hoc analysis.

3. The system according to claim 2, comprising:

at least one node processor being configured for automatically correlating data from the plural intelligent nodes and for generating the object based on a correlation of the shared data.

4. The system according to claim 2, comprising:

at least one node processor for mapping the human analytic tradecraft by correlating object-based evidence, including at least one generated object to activity which corresponds to the presence of that object.

5. The system according to claim 4, wherein the object based evidence includes information regarding objects generated and an input of at least one known real-world event to provide information regarding anticipated activity, wherein the mapping is auto-adapted to dynamically evolve based on the real-world event input.

6. The system according to claim 5, comprising:

a virtual mission folder stored on a memory or in persistent storage of an associated computer processor, the computer processor having a user interface for input of feedback from a user or a computer application to access the shared data, correlating of the shared data, and anticipated activity.

7. A method for collecting and analyzing data in a cognitive fabric to automate aspects of an analytic tradecraft within mind maps, the method comprising:

configuring a network of at least two intelligent nodes which communicate with one another for data analysis, each node being configured with a communication interface for sharing data as a function of analytic processing software to be executed at the node; and generating an object at a node via an on-board processor using the shared data from one or more sources and analytic processing software.

8. The method according to claim 7, wherein the network can be statically or dynamically defined to represent either a structured or ad hoc analysis.

* * * * *

UNITED STATES PATENT AND TRADEMARK OFFICE
CERTIFICATE OF CORRECTION

Page 1 of 1

PATENT NO. : 10,902,333 B2
APPLICATION NO. : 16/596188
DATED : January 26, 2021
INVENTOR(S) : Ki Hyun Lee et al.

It is certified that error appears in the above-identified patent and that said Letters Patent is hereby corrected as shown below:

In the Claims

Column 8, Line 46, Claim 7, following the word "using" please delete the word "the".

Signed and Sealed this
Ninth Day of March, 2021

Drew Hirshfeld
*Performing the Functions and Duties of the
Under Secretary of Commerce for Intellectual Property and
Director of the United States Patent and Trademark Office*